US006446743B2

(12) United States Patent
Suzuki

(10) Patent No.: US 6,446,743 B2
(45) Date of Patent: Sep. 10, 2002

(54) WIRE HARNESS ASSEMBLY LINE AND WHEELED WORKTABLES

(75) Inventor: Toshiaki Suzuki, Nagoya (JP)

(73) Assignees: Autonetworks Technologies, Ltd., Aichi (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/750,053

(22) Filed: Dec. 29, 2000

(30) Foreign Application Priority Data

Jan. 11, 2000 (JP) ....................................... 2000-002447

(51) Int. Cl.7 ................................................ B60T 7/16

(52) U.S. Cl. ........................... 180/168; 901/1; 318/587

(58) Field of Search ................................ 180/167, 168, 180/169, 14.1; 700/228; 318/587; 901/1, 50; 701/23, 24, 25, 26, 27, 28; 198/346.2, 468.2, 750.11; 15/340.1

(56) References Cited

U.S. PATENT DOCUMENTS

| | | | | | |
|---|---|---|---|---|---|
| 4,042,058 | A | * | 8/1977 | Cooper | 180/168 |
| 4,968,878 | A | * | 11/1990 | Pong et al. | 250/221 |
| 5,036,935 | A | * | 8/1991 | Kohara | 180/168 |
| 5,109,597 | A | | 5/1992 | Elder et al. | |
| 5,293,955 | A | * | 3/1994 | Lee | 180/169 |
| 5,341,540 | A | * | 8/1994 | Soupert et al. | 15/319 |
| 5,377,106 | A | * | 12/1994 | Drunk et al. | 701/25 |
| 5,526,562 | A | | 6/1996 | Kita et al. | |
| 5,613,261 | A | * | 3/1997 | Kawakami et al. | 15/98 |
| 5,894,621 | A | * | 4/1999 | Kubo | 15/50.1 |
| 5,935,179 | A | * | 8/1999 | Kleiner et al. | 701/23 |
| 6,038,521 | A | * | 3/2000 | Kanai | 702/121 |
| 6,119,057 | A | * | 9/2000 | Kawagoe | 701/23 |
| 6,226,830 | B1 | * | 5/2001 | Hendriks et al. | 15/319 |
| 6,298,281 | B1 | * | 10/2001 | Menard et al. | 700/228 |

* cited by examiner

*Primary Examiner*—Brian L. Johnson
*Assistant Examiner*—Bryan Fischmann
(74) *Attorney, Agent, or Firm*—Oliff & Berridge, PLC

(57) ABSTRACT

Each of the wheeled worktables 1, which is isolated from the others, travels self-dependently with drive of the motor M and the sensor (optical recognition device) 5 is provided on each wheeled worktable 1 while the optical recognition tape T as the recognition object for the sensor 5 is attached to the predetermined conveyance passage on the floor 11 for inducement of the wheeled worktables 1. Since the modification of the conveyance passage to meet any need of increase or decrease of the wheeled worktables is carried out only by reattachment of the optical recognition tape T, the passage can be modified into any form by a simple operation without generation of useless spaces between the adjoining wheeled worktables 1 and, without any mechanical restraint on the wheeled worktables, replacement of the wheeled worktables 1 for any increase or decrease in the wheeled worktables do not require such labor and time for dismounting from and remounting on the chain as in the case of the assembly line driven with the endless chain.

20 Claims, 11 Drawing Sheets

WIRE HARNESS ASSEMBLY LINE AND WHEELED WORKTABLES

BACKGROUND OF THE INVENTION

The present invention relates to a wire harness assembly line.

In the above-described wire harness assembly line, an operation chart board for each of the processes is mounted on each of wheeled worktables and conveyed to a operator's station in a sequence of the processes, and the operator works sequentially on the chart board to complete the product. FIG. 11 shows an example of the conventional wheeled worktable conveyance line that is driven with an endless chain.

As shown in the figure, a straight outbound passage 23 and a straight return passage 24 are installed parallel as conveyance passages of wheeled worktables 21 and both ends are connected with turning parts 25 and 26 making a closed passage, wherein an endless driving chain 22 is installed along the closed passage with the aforenamed wheeled worktables linked with the chain 22 in the order of the processes and moved in one direction with chain 22 driven by a motor MC. Operators m are shown respectively behind the wheeled worktables 21 in the figure and each of the operators m assembles parts on the operation chart board on the wheeled worktable 21 on arrival of the wheeled worktable 21 at the position of the operator m.

Both the turning parts 25 and 26 are simply places for directional changes of the wheeled worktables 21, and no work is done there. An entrance 27 for finished products from a previous process is built on the outbound passage side of the turning part 26 while an exit 28 for the finished product in this assembly line is built on the return passage side.

In such an assembly line, classified flow process operations are carried out for efficient manufacturing of the wire harnesses.

However, the following problems exist in the conventional assembly line in the form as described above.

(1) In a case of change in production mode (production amount or production model) as the object of line manufacturing, the aforenamed wheeled worktables 21 need to be increased or thinned out and, for this purpose, the above-described assembly line form wherein the chain 22 is secured along the conveyance passage of the wheeled worktables 21 requires a large scale of remodeling of the transportation mechanism, through replacement or cut of the chain 22 but the work requires a lot of human power, and requires the assembly line to stop for a long time.

It may be convenient if the conveyance passage is large enough to allow any immediate increase in the wheeled worktables, but this can cause increase in the pitch of spacing between the wheeled worktables, which can result in decrease in conveyance efficiency and, accordingly, decrease in production efficiency.

In case the wheeled worktables are thinned out under this circumstance, the spacing pitch between the wheeled worktables becomes larger and the assembly line production efficiency becomes lower.

Moreover, this is a great loss in the aspect of the site use efficiency.

(2) In a case of replacing only the wheeled worktables 21 for a reason of change in the model to be manufactured, even without changes in the production amount as the object of manufacturing and accordingly without increase or decrease in the number of the wheeled worktables 21, the assembly line stagnates greatly since it gives trouble and takes time to dismount from and mount on the chain 22.

(3) In a case of loss in the chain 22 or a malfunction of the drive motor MC, it gives trouble and takes time for the recovery, and, in general, it costs a lot for the repair.

Moreover, this is a great loss in the aspect of the site use efficiency.

(2) In a case of replacing only the wheeled worktables 21 for a reason of change in the model to be manufactured, even without changes in the production amount as the object of manufacturing and accordingly without increase or decrease in the number of the wheeled worktables 21, the assembly line stagnates greatly since it gives trouble and takes time to dismount from and mount on the chain 22.

(3) In a case of loss in the chain 22 or a malfunction of the drive motor Mc, it gives trouble and takes time for the recovery, and, in general, it costs a lot for the repair.

SUMMARY OF THE INVENTION

Therefore, the invention is purposed to solve the above-described problems in the conventional wire harness assembly line, making the assembly line in the form that can afford any change in the assembly line configuration on rise of any need for change in the production amount and/or in such the production form, such as the model, and that can afford the change without troublesome operations and at low costs, with successful prevention of any decrease in the assembly line conveyance efficiency, or accordingly any decrease in the production efficiency.

To solve the above-described problems, the invention has a structure wherein each of the wheeled worktables travels self-dependently with drive of a motor while being isolated from the others and wherein each of the wheeled worktables is equipped with a sensor for travel along predetermined conveyance passage on a floor while objects of recognition by the sensor are installed along the predetermined route on the floor surface.

The structure enables assembly line change only with replacement of the sensor recognition objects and rerouting of the wheeled worktable conveyance passage. The recognition object of the sensor is usually an optical recognition tape or a magnetic recognition tape that is attached to a floor where the wheeled worktables travel and that is easy to be attached and removed. Since the conveyance route can be modified into any desired form only by the tape replacement, an optimum rerouting that eliminate every unnecessary space between adjacent wheeled worktables with setting of a maximum conveyance efficiency (accordingly the production efficiency) is available at any increase or decrease in the wheeled worktable number. Moreover, the cost is small.

Additionally, such is a desirable configuration that a rectangle whose center line is parallel to a travelling direction of the wheeled worktable is defined on the bottom surface of the wheeled worktable while an isosceles triangle whose base and height are equal is defined in such manner that an symmetry axis thereof overlaps the center line of the rectangle with the base including a midpoint of the rectangle and by that a driving wheel that has a steering function is disposed at a vertex of the isosceles triangle while trailing wheels are securely disposed at both ends of the base in such manner that the revolving surfaces thereof are always in a direction parallel to the travelling direction of the wheeled worktable. As shown in FIG. 6 below and FIGS. 8 through 10 as its comparison examples, this configuration enables reduction of the entire assembly line size since the turnabout of the wheeled worktable at the turning part of the assembly line can be carried out most efficiently with a small turn to result with reduction in the space occupation at the turning part.

DETAILED DESCRIPTION OF THE PREFERRED EMBODIMENTS

Figure 1A:
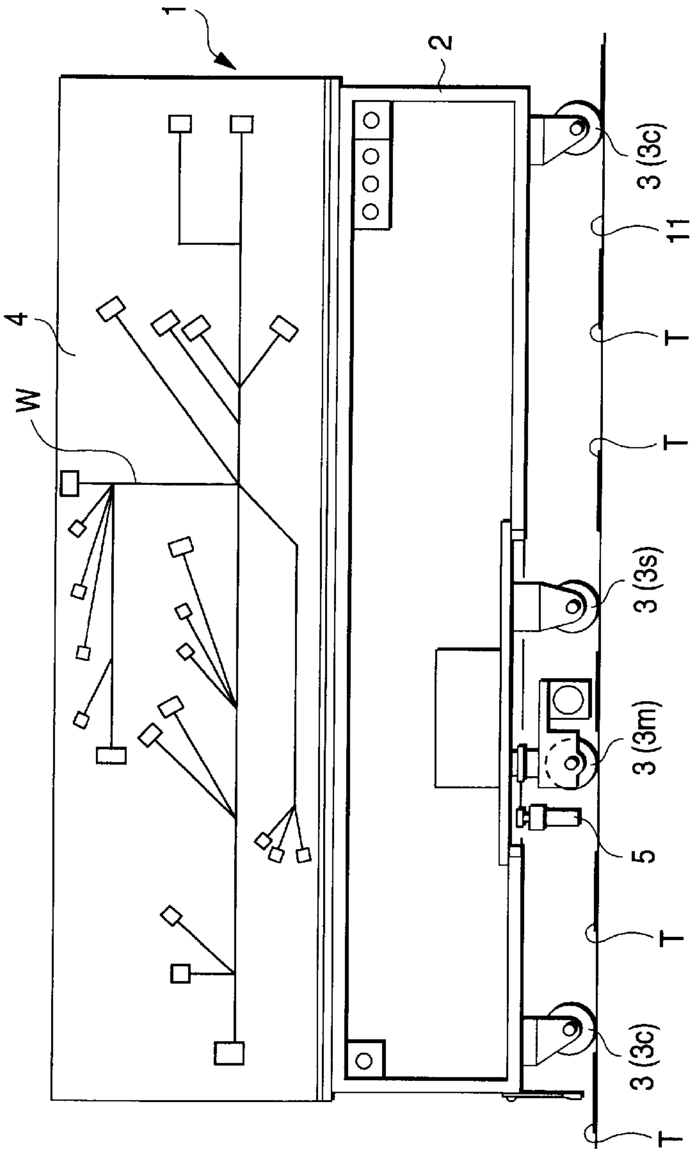
FIG. 1A is a front elevation.
Figure 1B:
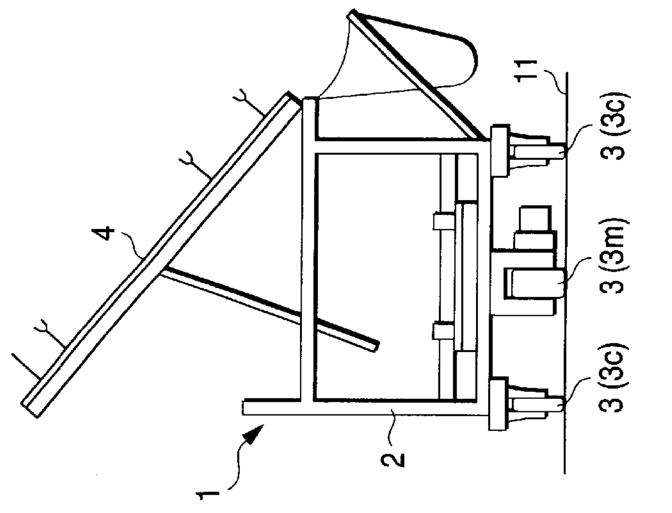
FIG. 1B is a side view of the wheeled worktable of the embodiment.

The following paragraphs describe the embodiments of the wire harness assembly line related to the invention. FIG. 1 shows an embodiment as a wheeled worktable 1, wherein an entire body of a wheeled base part 2 is formed with square pipes into a hexahedron, which is provided with wheels 3 at the bottom and an operation chart board 4 (an assembly chart board) on the upper surface.

As described later in detail, the wheels 3 consist of four auxiliary wheels 3*c* that are installed in the four corners of a rectangular bottom of the wheeled worktable 1 and a driving wheel 3*m* and two trailing wheels 3*s* that are installed at the center part. The driving wheel 3*m* that is driven by a motor M that is suspended from the bottom of the wheeled worktable 1 has a steering function while rotational surfaces of the trailing wheels 3*s* are always maintained parallel in the travelling direction (longitudinal direction) of the wheeled worktable 1. The auxiliary wheels 3*c* are designed only for stable support of the wheeled worktable 1, and each of the rotational surfaces can rotate 360° freely on a vertical axis.

On the top of the operation chart board 4, a wire harness W in the process of assembling is mounted.

A sensor inducement system for travel of the wheeled worktable 1 along the predetermined conveyance route is installed between the above-described self-driven wheeled worktable 1 and the floor 11 where it moves. As the sensor inducement system, a sensor (an optical recognition device) 5 is mounted on the bottom of the wheeled worktable 1 while an optical recognition tape T which is a recognition object of the sensor 5 is attached to a surface of the floor 11 along the predetermined conveyance route. The wheeled worktable 1 whose sensor 5 recognizes the optical recognition tape T is enabled to travel without deviating from the conveyance route.

Thus, this wheeled worktable 1 is a self-travelling wheeled conveyance worktable which travels automatically along the predetermined route by the driving wheel 3*m* that is driven by the motor M and the above-described sensor inducement system.

Figure 2:
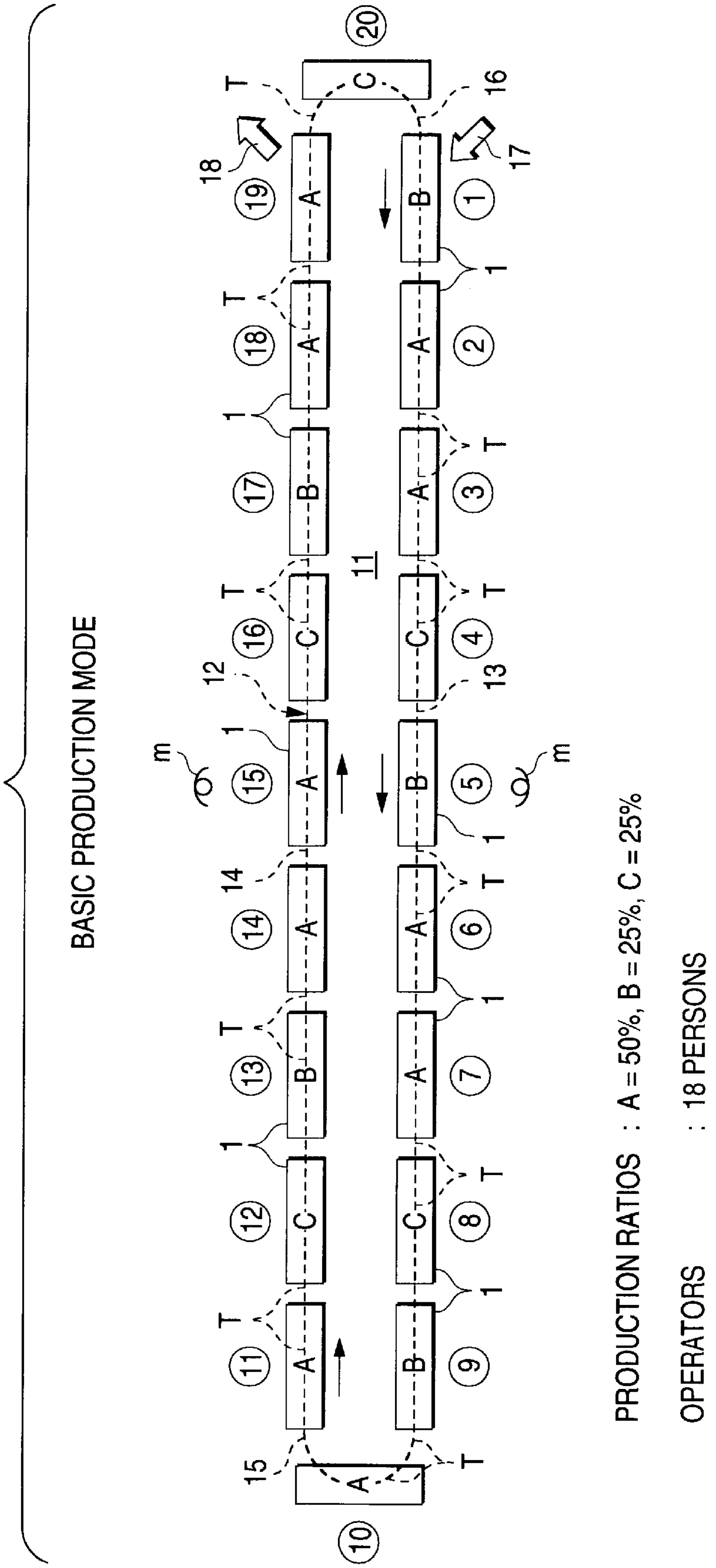
FIG. 2 is a modal drawing to show the basic production mode of the assembly line of the embodiment.
Figure 3:
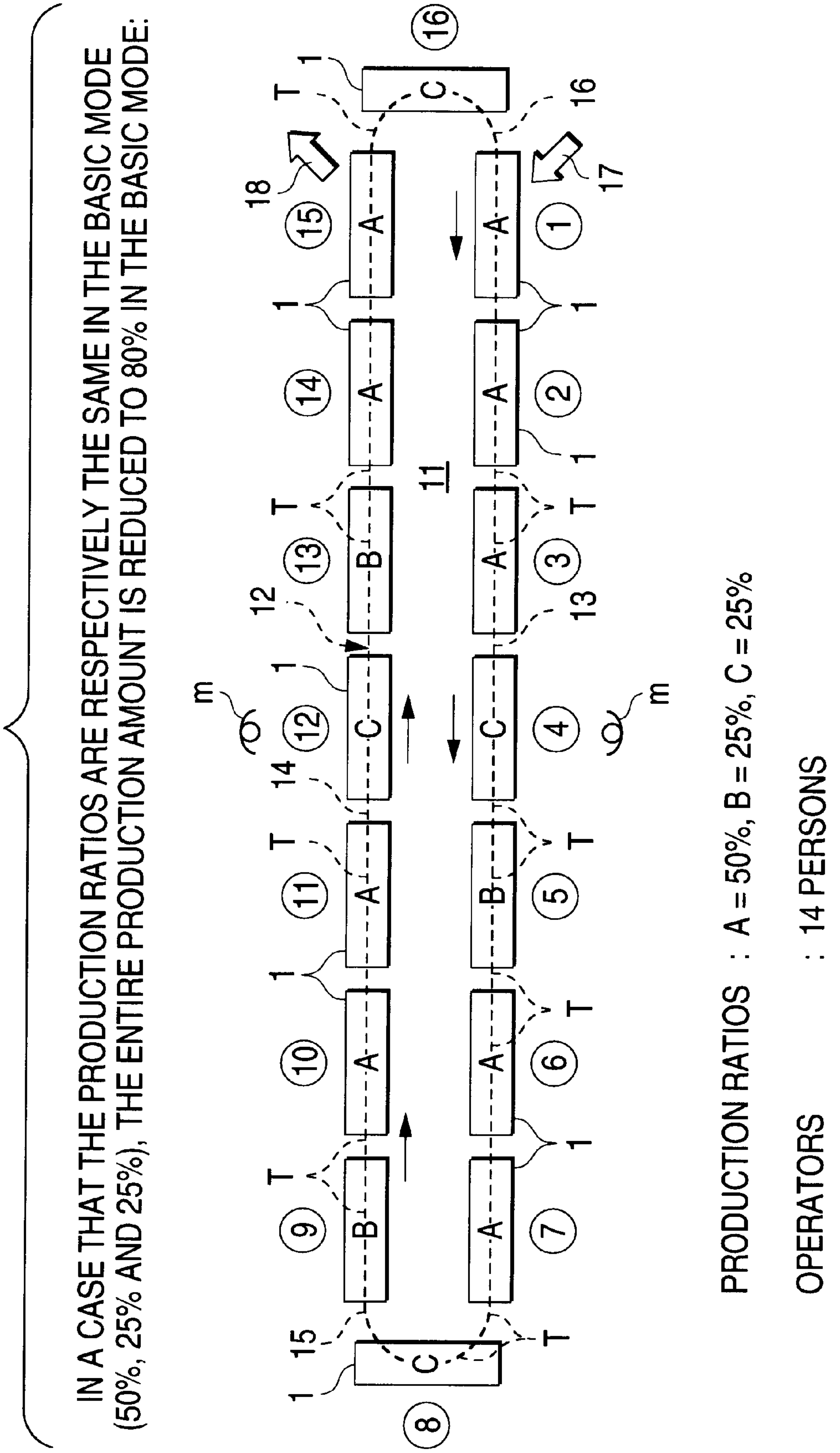
FIG. 3 is a modal drawing to show a variation of the embodiment in FIG. 2.
Figure 4:
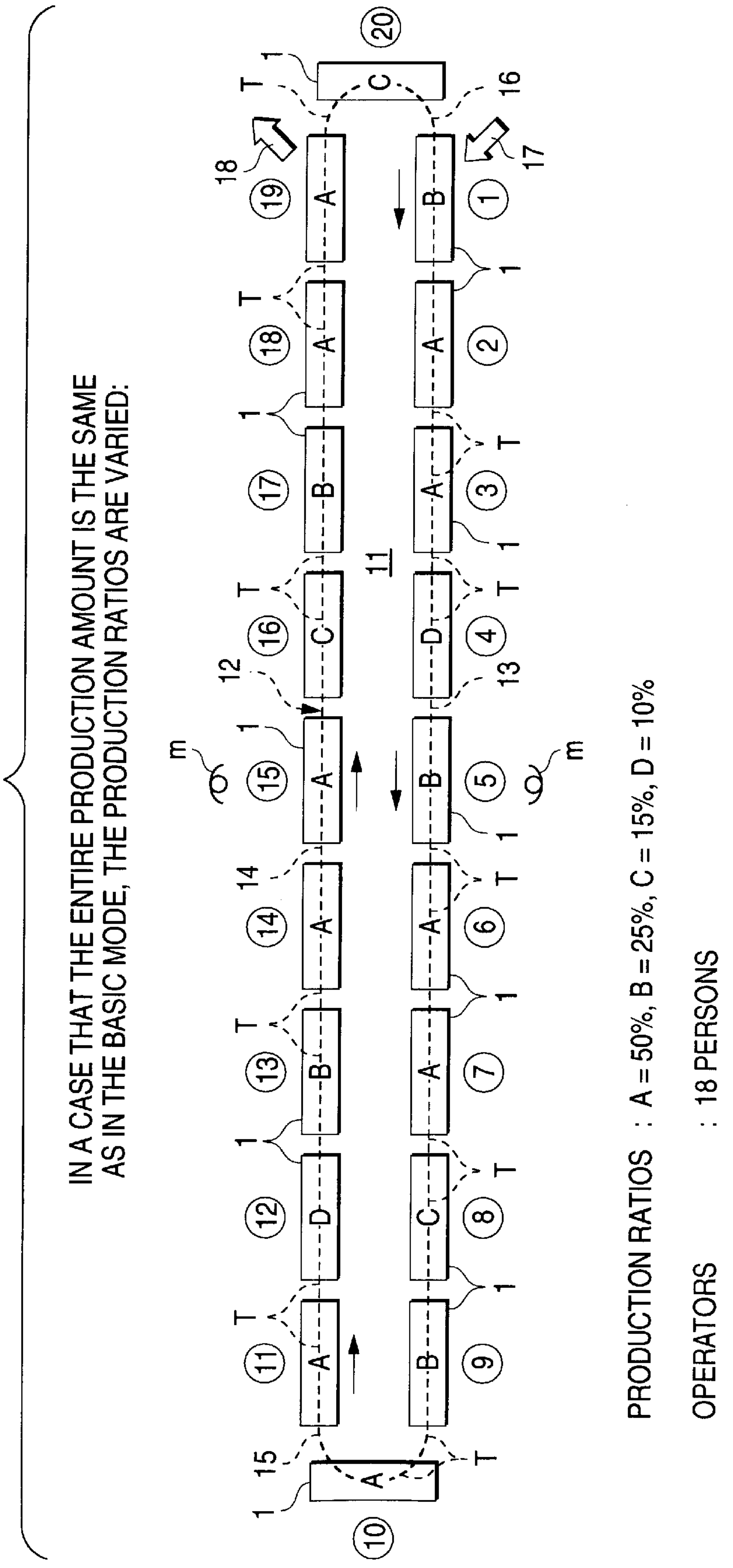
FIG. 4 is a modal drawing to show another variation of the embodiment in FIG. 2.

FIGS. 2 through 4 modally show a conveyance passage 12 and a wire harness assembly line along which the wheeled worktables 1 travel, wherein, as shown in the figures, in the same manner as in the case of the above-described conventional endless chain, a straight outbound passage 13 and a straight return passage 14 are provided parallel with both ends thereof connected to turning parts 15 and 16 making a closed passage, and wherein the aforenamed optical recognition tape T is attached along the closed conveyance passage 12.

White arrows 17 and 18 over and below the turning part 16 to the right in the figures of the conveyance passage 12 indicate incoming and outgoing of the products to this assembly line, wherein the lower arrow 17 indicates incoming finished products from the previous process of the assembly line while the upper arrow 18 indicates outgoing finish products from this assembly line to the next process.

Figure 11:
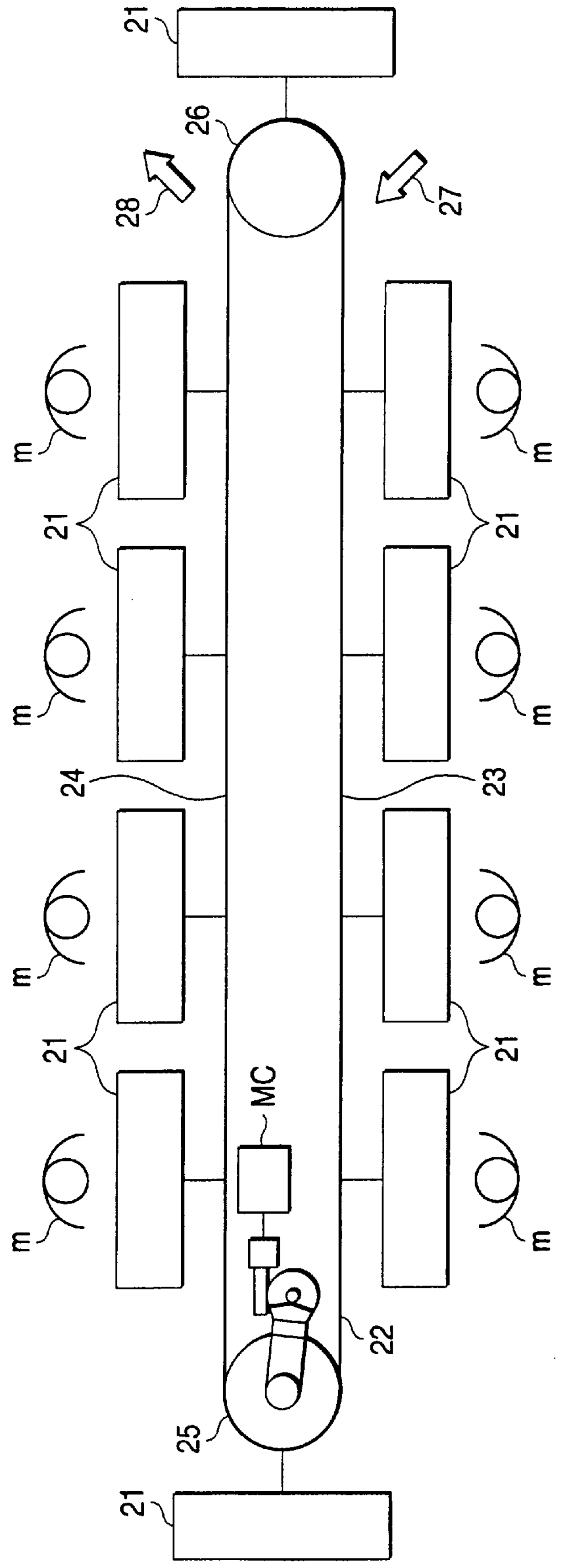
FIG. 11 (PRIOR ART)
FIG. 11 is a modal drawing to show the conventional wire harness assembly line.

The assembly line where the self-travelling wheeled worktable 1 moves is different from the assembly line that is formed through securing of the conventional endless chain 22 as shown in FIG. 11 and the conveyance passage 12 can be changed into any desired way only through replacement of the optical recognition tape T on the floor 11. The replacing operation is not troublesome and the tape T is inexpensive; therefore, in a case of increasing or decreasing the wheeled worktables to meet a change in the production mode (ratio of the production amount and the model), the action can be taken instantaneously without elaboration. FIGS. 3 and 4 show modifications in the assembly line of the embodiment that incorporates flexibility to changes, with the production mode in FIG. 2 as a basic.

In the assembly line shown in FIG. 2, twenty wheeled worktables 1, which are marked with signs (1) through (20), are arranged on the conveyance passage 12, and three kinds of models A, B and C are allotted and manufactured on these with the manufacturing ratios of models in the assembly line are respectively 50%, 25%, and 25%; that is, ten wheeled worktables 1 for manufacturing of Model A, five wheeled worktables 1 for manufacturing of Model B and five wheeled worktables 1 for manufacturing of Model C.

Since no operations, except turning, are carried out on the wheeled worktables 1 at the turning parts 15 and 16 on the right and left of the figure, which are marked with (10) and (20), eighteen operators m are stationed along both of the straight parts 13 and 14 in the conveyance passage 12 of the wheeled worktables 1. The operators m are shown only on one side of the wheeled worktables 1 that are marked with (5) and (15) to avoid complexity in the figure but they are actually stationed respectively in the positions of all of the wheeled worktables 1 except the aforenamed wheeled worktables 1 that are marked with (10) and (20).

Although the manufacturing models in FIG. 3 are the same models A, B and C as in the basic mode in FIG. 2 above and the ratios are respectively the same 50%, 25% and 25%, the entire production amount is reduced to 80% and the number of the wheeled worktables 1 is thinned out to sixteen, which is four wheeled worktables less than in the basic mode; namely, eight wheeled worktables 1 for manufacturing of Model A, four wheeled worktables 1 for manufacturing of Model B and four wheeled worktables 1 for manufacturing of Model C. The number of operators is reduced to fourteen.

In this case of assembly line modification, although the wheeled worktables 1 are thinned out by four wheeled worktables 1 to sixteen, since a simple operation can reduce the conveyance passage 12, the sixteen wheeled worktables 1 can be disposed without useless space between the adjacent, and thus the conveyance efficiency is maintained for 100% without fall in the production efficiency.

Similarly, in the assembly line shown in FIG. 4, although the production amount and the number of the wheeled worktables 1 are the same as in the basic mode (twenty wheeled worktables 1 and 18 operators), the number of production models is increased with addition of D to the three models A, B and C and the production ratios change into 50%, 25%, 15% and 10%; namely, ten wheeled worktables 1 for manufacturing of Model A, five wheeled worktables 1 for manufacturing of Model B, three wheeled worktables 1 for manufacturing of Model C and two wheeled worktables 1 for manufacturing of Model D.

In this case, the change in the assembly line is achieved by replacement of the wheeled worktables 1 and, since each of the wheeled worktables 1 is isolated from the others and induced to travel along the conveyance passage 12 by the above-described sensor inducement system at the time of travel, being totally free from any mechanical restraint, such as linkage with the chain in the case of endless-chain assembly line, the replacement involves no troublesome operation, such as removal and reattachment of the chain, and thus prevents the time loss due to such troublesome operations.

As described above, this embodiment enables construction of the assembly line wherein the shape of conveyance passage 12 for the wheeled worktables 1 can be changed into any desired form without causing a fall in the conveyance efficiency and, in the case of replacing the wheeled worktables 1, the wheeled worktables 1 can be increased and decreased without causing a time loss for the replacement.

Moreover, in the case of the conventional chain drive, it takes a lot of time and labor to recover from problems such as the chain being cut or breakdown of the drive motor, but, in the case of the sensor inducement system like this embodiment, the breakdown of the sensor itself occurs infrequently, and even a major breakdown is as insignificant as soilage or damage on the recognition tape T, which is repaired merely by replacement of the tape T, which takes only a short time and little labor and expense.

Although the sensor inducement system in this embodiment is of the optical recognition type and the recognition object is the optical recognition tape, the sensor of a magnetic perception type with use of a magnetic recognition tape as the recognition object is also available.

Although the assembly line in this embodiment is advantageous as described above and the problems of the conventional endless chain are solved, the embodiment goes further with reduction in the occupation area of the assembly line through contrivance in the layout of the wheels 3 of the wheeled worktable 1. That is, of the three kinds of the wheels 3, which are the driving wheel **3*m*, the trailing wheel 3*s* and auxiliary wheels 3*c*, the layout of the driving wheel 3*m* and the trailing wheels 3*s* is specified in a certain shape to minimize the turning locus at the turning parts 15 and 16 of the conveyance passage 12. As described above, the auxiliary wheels 3*c* are purposed only for stable support of the wheeled worktable 1**.

Figure 5:
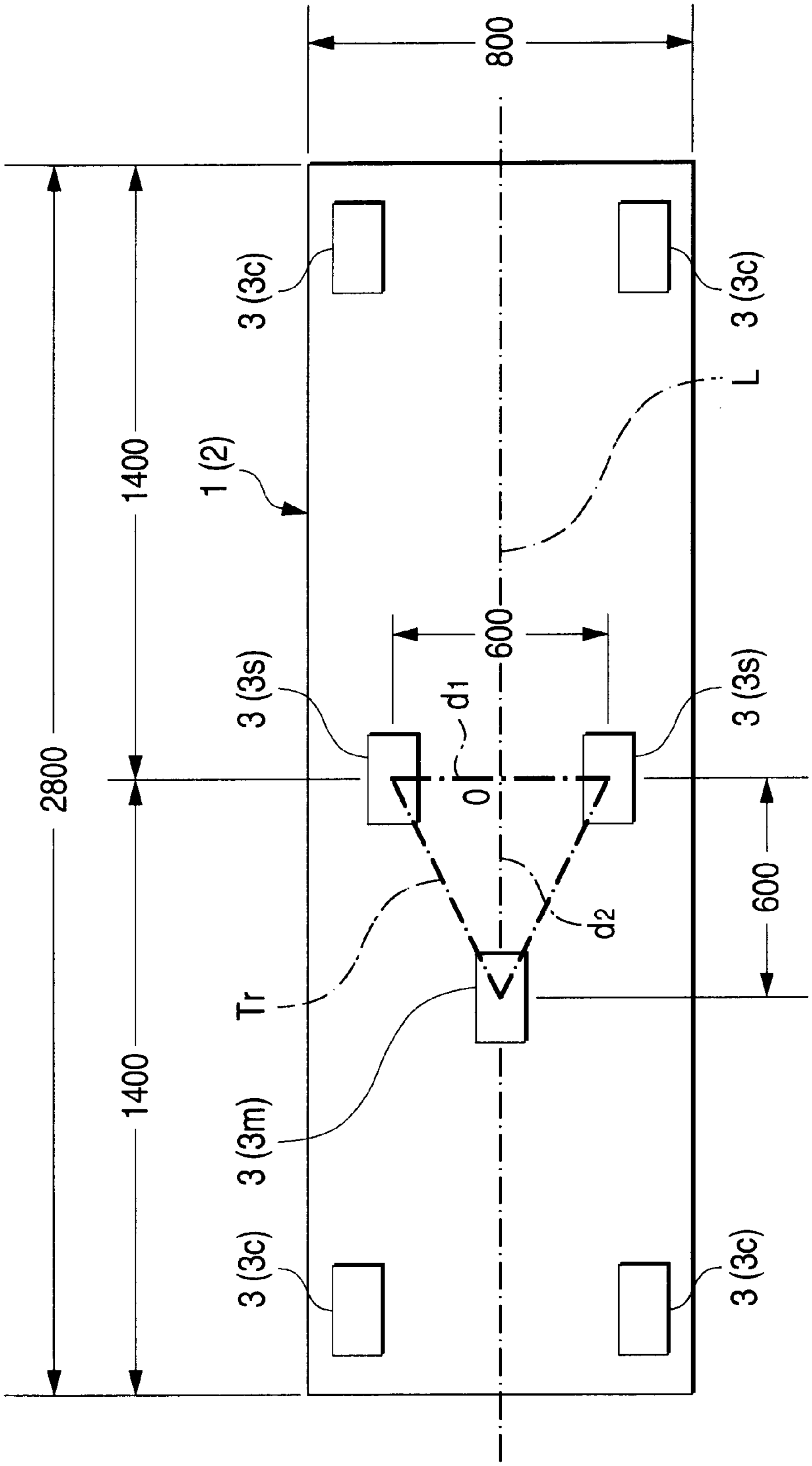
FIG. 5 is a modal drawing to show a wheel layout of the wheeled worktable of the embodiment.
Figure 6A:
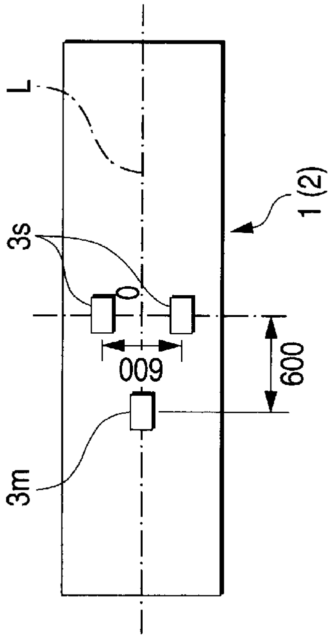
FIG. 6A shows a wheel layout of the wheeled worktable and FIG. 6B shows a locus thereof at the turning part.
Figure 6B:
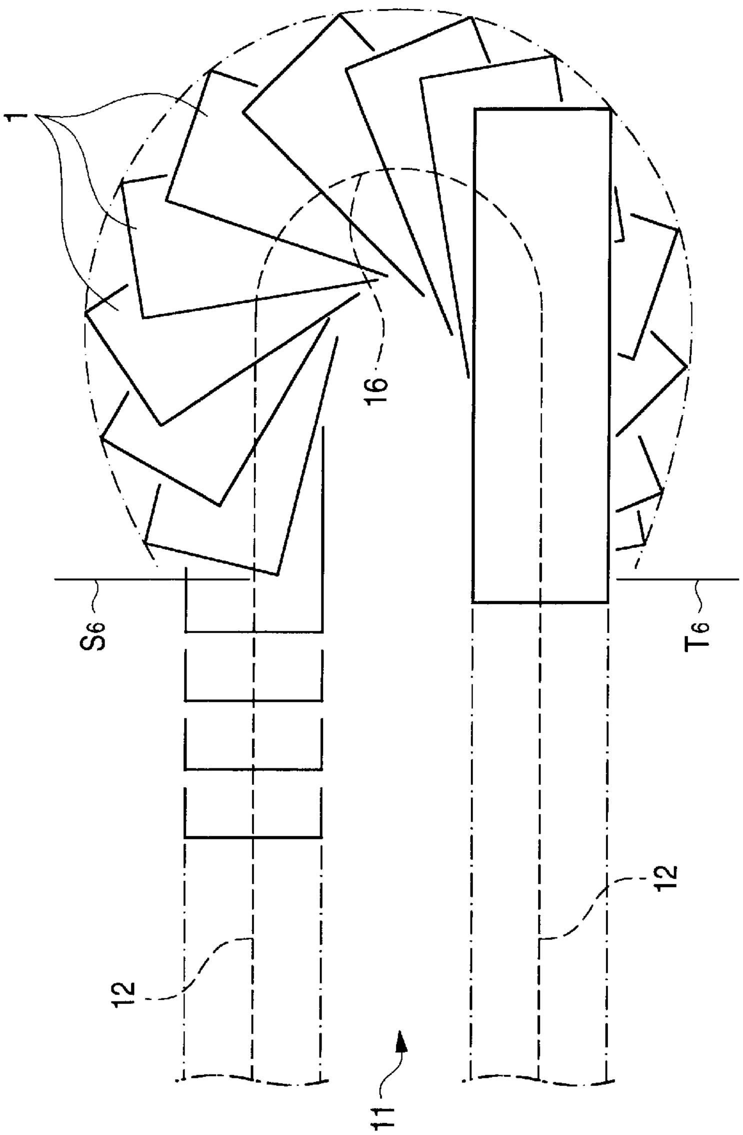

FIG. 5 modally shows the layout of the wheels 3 that are provided on the bottom of the wheeled worktable 1 (wheeled base part 2) in this embodiment. FIG. 6A is a sketch of the driving wheel **3*m* and the trailing wheels 3*s* as an exclusive extract from FIG. 5 and FIG. 6B shows the locus of the wheeled worktable 1 with this wheel layout when turning at the right turning part 16 in the above-described conveyance passage 12. Since the assembly line is formed in a symmetrical shape, it is similar at the left turning part 15**.

Figure 7:
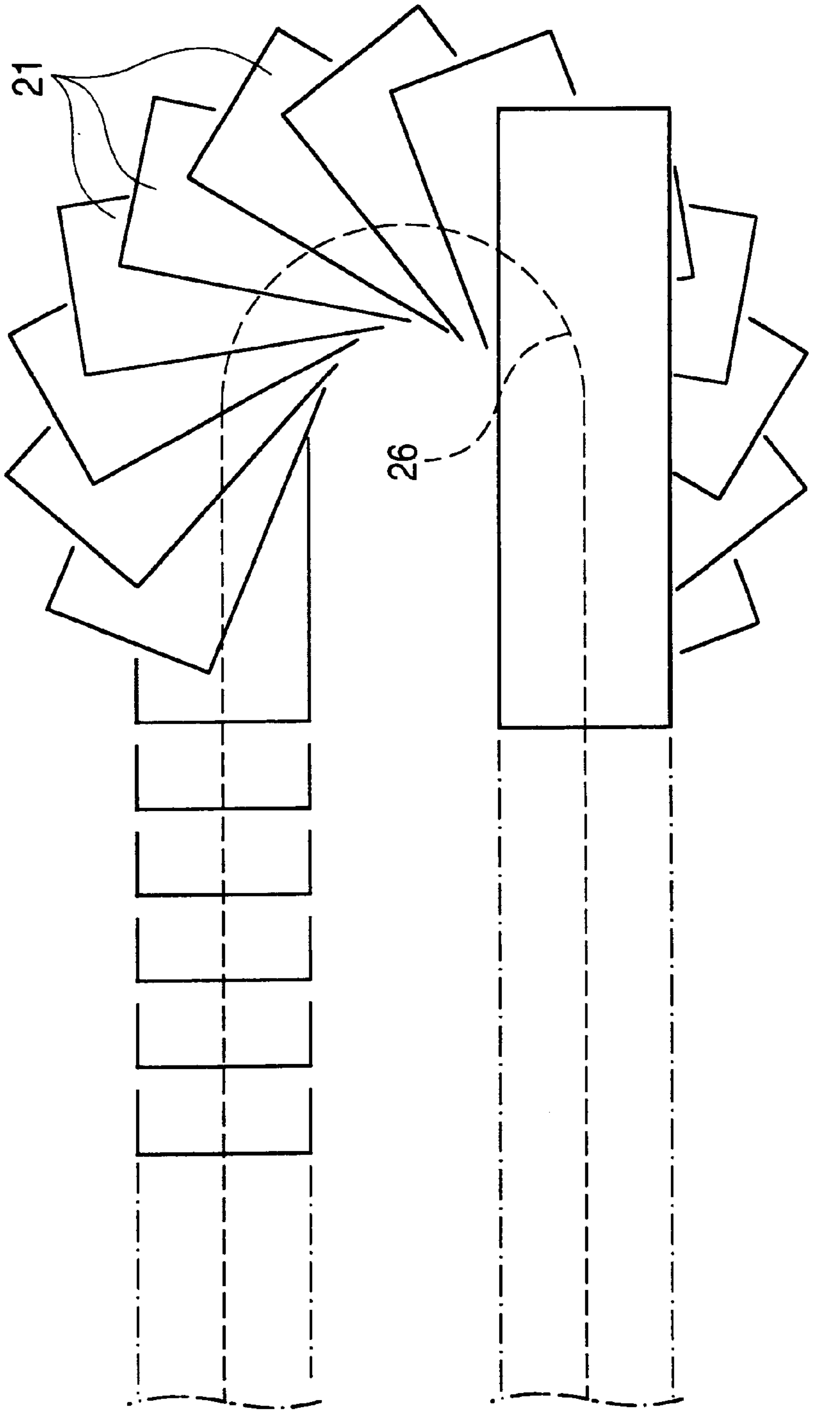
FIG. 7 (PRIOR ART)
FIG. 7 shows a locus at the turning part of a conventional assembly line.

FIG. 7 shows a locus of the wheeled worktable 1 with the same external shape of the bottom when turning at the turning part in the conventional assembly line that is driven with the endless chain.

For further comparison, FIGS. 8 through 10 show the loci of the wheeled worktables 1 of other embodiments together with different wheel layouts (drawing A in each of the figures) when turning at the same turning part 16 (the same as at the turning part 15).

Since the external dimensions of the wheeled worktables 1 and their composition that auxiliary wheels **3*c* are provided in the four corners are common to all the wheeled worktables 1, and the four corners is common to all, each of the wheel layout drawings (drawing A in each of the figures) shows only the driving wheel 3*m* and the trailing wheels 3*s*. The following paragraphs describe on the differences in the turning manners of the wheeled worktables 1** of the embodiment and the variations for the comparison.

As shown in FIG. 5, the wheeled worktable 1 of this embodiment has a long side of 2800 mm and a short side of 800 mm, which is common to those of the variations for comparison in FIGS. 8 through 10. The driving wheel **3*m*** that has the steering wheel function is provided at the position on the center line L that is parallel to the long side of the rectangle and at 600 mm to the left in the figure from the midpoint o of the center line.

The two trailing wheels **3*s*** are provided on an orthogonal line of the center line L, which crosses at the midpoint o of the center line L, at symmetrical positions 600 mm apart on both sides of the above-described center line L.

The trailing wheels **3*s* are securely disposed so that the rotating sides thereof are always parallel to the longitudinal direction of the wheeled worktable 1**.

As shown in FIG. 6B, the turning locus of the wheeled worktable 1 in FIG. 5 (and FIG. 6A) at the turning part 16 is symmetric against the center line of the conveyance passage 12, with equal shapes of warps on both the outgoing passage side 13 and return passage side 14, which is the same as in the case of the conventional endless chain drive shown in FIG. 7.

Figure 8B:
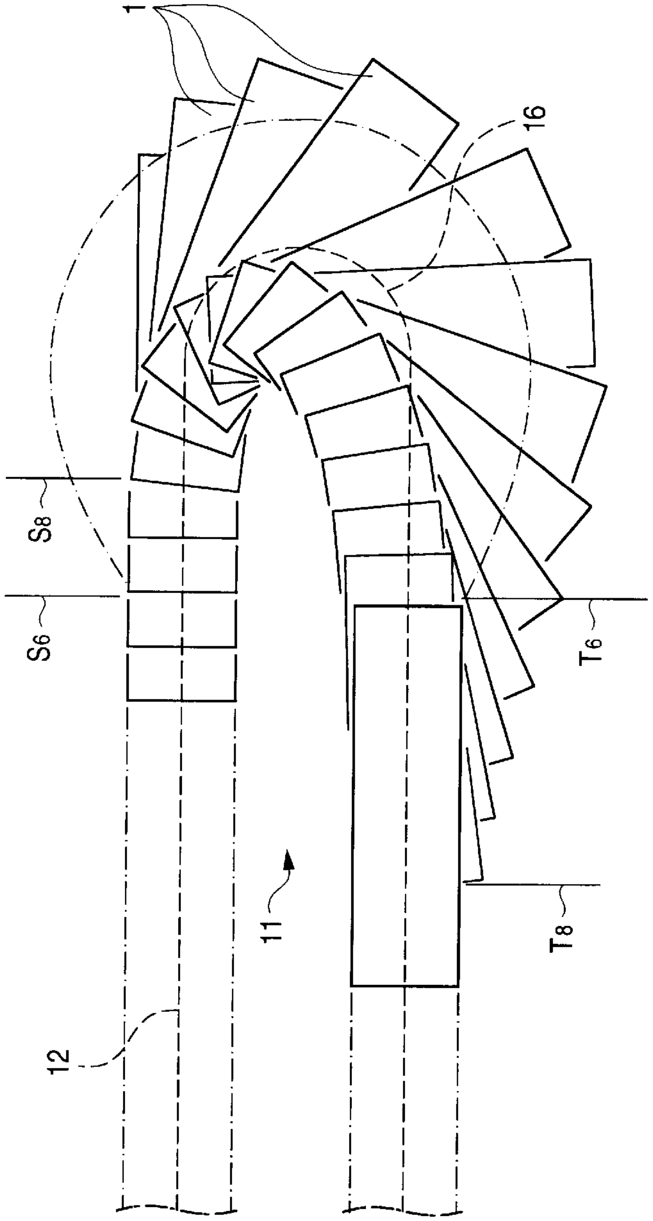
FIG. 8A shows a wheel layout and FIG. 8B shows a locus of a variation for comparison with FIG. 6.
Figure 8A:
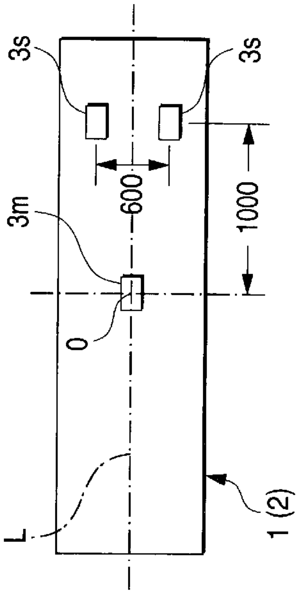

On the other hand, the one shown in FIG. 8 has a wheel layout as shown in FIG. 8A, wherein the driving wheel **3*m* is provided at the center o of the bottom of the wheeled worktable 1 while the two trailing wheels 3*s*** are provided on a line that crosses the center line L at a position 1000 mm apart to the right in the figure from the above-described center o on the center line L, at symmetrical positions 600 mm apart on both sides of the center line L.

Figure 9B:
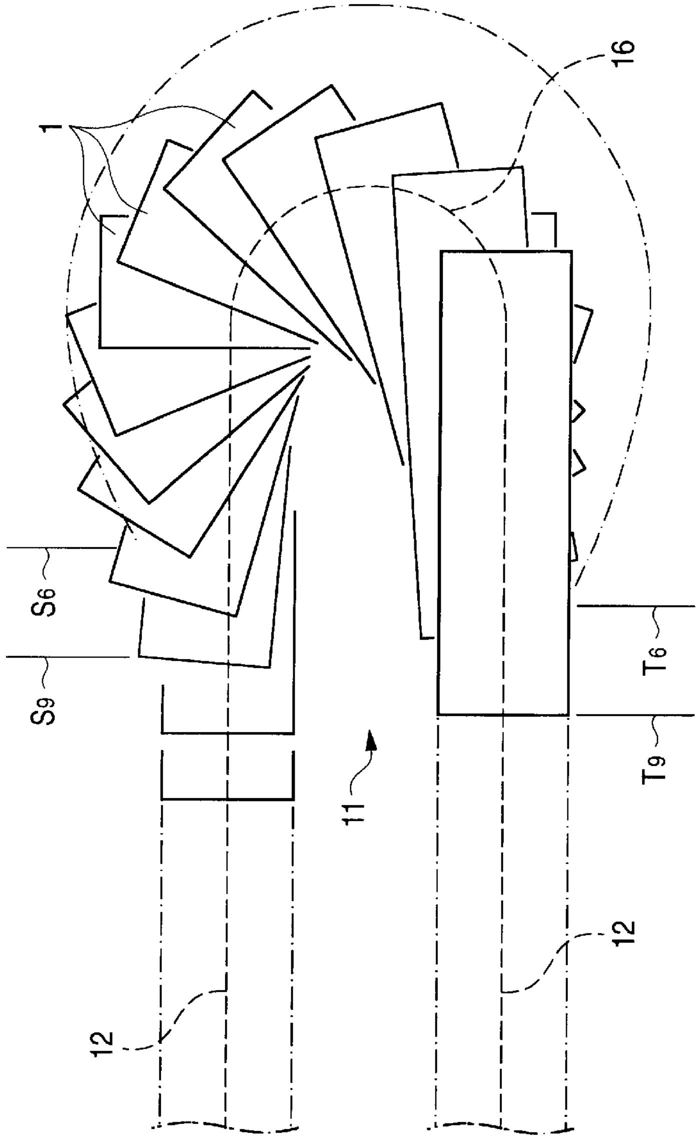
FIG. 9 is the same as the above.
Figure 10A:
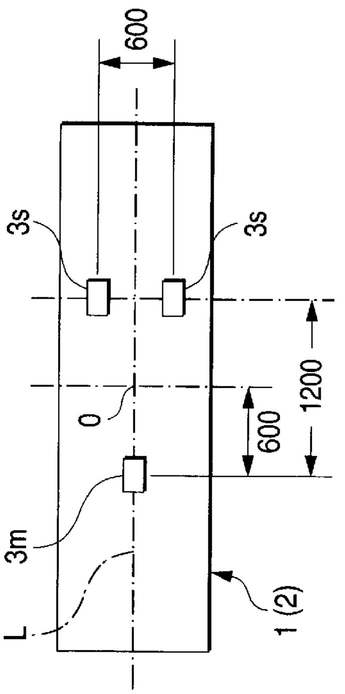
FIG. 10 is the same as the above.
Figure 10B:
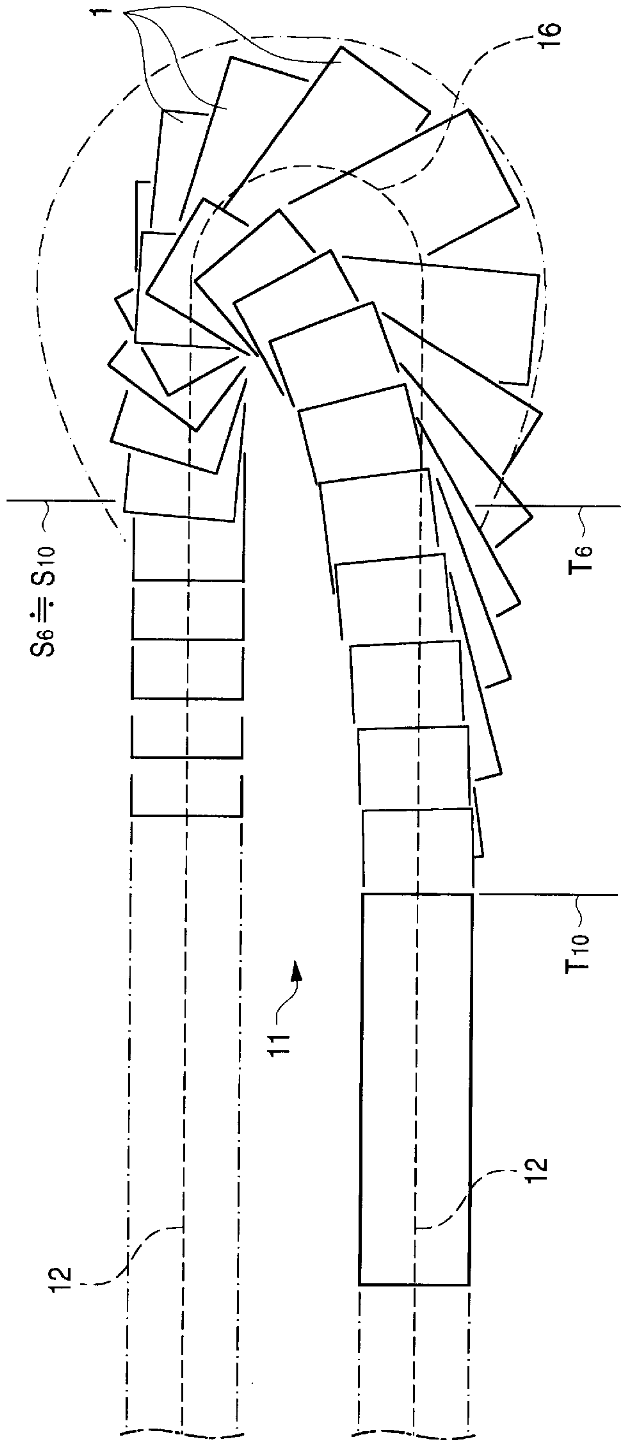

The turning locus of the wheeled worktable 1 at the turning part 16 is as shown in FIG. 8B and, for a purpose of comparison with the above-described FIG. 6B, the outer locus of the wheeled worktable 1 in FIG. 6B is shown with a one-dot-one-dash line in FIGS. 8B, 9B and 10B, with additional indication of a position $S_6$ for a shift of the wheeled worktable 1 from the straight return passage 14 to the turning part 16 and position $T_6$ for a shift from the turning part 16 to the straight outbound passage 13.

As elucidated by the figures, the locus of the wheeled worktable 1 in FIG. 8 occupies extra space that protrudes from the circle, in comparison with the one-dot-one-dash line that shows locus of the wheeled worktable 1 in FIG. 6.

The shift timing of the wheeled worktable 1 from the straight return passage 14 to the turning part 16 is late since the shift position $S_8$ is on the downstream side of the position $S_6$ in the case of FIG. 6, and the shift timing from the turning part 16 to the straight outbound passage 13 is also late since the position $T_8$ is on the downstream side of the conveyance passage 12 compared with the position $T_6$ in FIG. 6. This shows that a quite useless space exists between the straight part for assembly work and the turning parts of the wheeled worktable 1. Thus, in addition to that the above-described turning locus area is large, it is understood the wheeled worktable 1 in the layout of FIG. 8 requires a larger space than the case in FIG. 6.

Figure 9A:
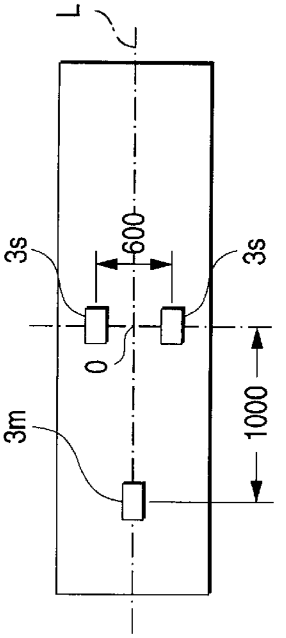

Similarly, the wheel layout of the one in FIG. 9 is as shown in FIG. 9A, wherein the two trailing wheels 3*s* are disposed on an orthogonal line that crosses the center line L at the center o of the bottom and 600 mm apart symmetrically on both sides of the center line L while the driving wheel 3*m* is disposed on the center line L and at a position 1000 mm apart from the center o to the left in the figure. The locus of the wheeled worktable 1 turning at the turning part 16 is as shown in FIG. 9B.

Compared with the locus of the wheeled worktable 1 in FIG. 6, which is shown by the one-dot-one-dash line, the locus in this case is within the circle and the occupied space is reduced. Although the shift timing of the wheeled worktable 1 from the return passage 14 to the turning part 16 is early since the shift position $S_9$ is on the upstream side of the position $S_6$ in the case of FIG. 6, which is superior to the case in FIG. 6, the shift timing from the turning part 16 to the straight outbound passage 13 is late since the position $T_9$ is on the downstream side of the conveyance passage 12 compared with the position $T_6$ in FIG. 6, and this delay in the timing so great as leaving some useless part behind after canceling out the foregoing advantageous result; this concludes that the extra space is occupied in this case by comparison with the one in FIG. 6.

The wheel layout of the one in FIG. 10 is as shown in FIG. 10A, wherein the driving wheel 3*m* is disposed on the center line L and at a position 600 mm apart from the center o to the left in the figure while the two trailing wheels 3*s* are disposed on an orthogonal line that crosses the center line L at the center o of the bottom and 600 mm apart symmetrically on both sides of the center line L. The locus of the wheeled worktable 1 turning at the turning part 16 is as shown in FIG. 10B.

Compared with the locus of the wheeled worktable 1 in FIG. 6, which is shown by the one-dot-one-dash line, the locus in this case is also within the circle and the occupied space is reduced. Although the shift position $S_{10}$ of the wheeled worktable 1 from the return passage 14 to the turning part 16 is approximately the same as the position $S_6$ in the case of FIG. 6, the shift timing from the turning part 16 to the straight outbound passage 13 is late since the position $T_{10}$ is considerably far on the downstream side of the conveyance passage 12, compared with the position $T_6$ in FIG. 6, and this also concludes that the extra space is occupied in this case in the same way as the in the case in FIG. 9.

The other simulation with varied wheel layouts besides the cases shown in FIGS. 8 through 10 indicate that the turning loci at the turning part include the useless space, compared with the embodiment shown in FIG. 6, in the same way as the cases shown in FIGS. 8 through 10.

Thus, the wheel layout in this embodiment can minimize the occupation area of the turning locus of the wheeled worktable 1 at the turning part 16 and the assembly line with the best space occupation efficiency as a whole can be constructed.

Although the wheel layout of the embodiment shows actual dimensions in FIG. 5 and FIG. 6A, this is described generally with reference numerals and signs in FIG. 5 as follows: a driving wheel that has a steering function is disposed at a vertex of an isosceles triangle Tr that is defined as an isosceles triangle Tr whose base d1 and height d2 are equal is defined in such manner that a symmetry axis thereof overlaps the center line L in the longitudinal direction (travelling direction of the wheeled worktable 1) and whose base d1 includes a midpoint of the center line L while trailing wheels are securely disposed at both ends of the base d1 in such manner that the revolving surfaces thereof are always in a direction parallel to the travelling direction of the wheeled worktable 1.

As described above, since the invention wherein each of the wheeled worktables moving in the assembly line travels self-dependently with drive of the motor while being isolated from the others and wherein each of the wheeled worktables is equipped with the sensor and inducted by the sensor recognition objects that are installed along the predetermined route on the floor surface enables modification of the conveyance passage for any increase or decrease in the wheeled worktables only with replacement of the sensor recognition objects and thus the conveyance route can be modified into any desired form by the simple operation without causing any degradation in the conveyance efficiency at the increase or decrease in the wheeled worktable number.

At the wheeled worktable replacement, since each of the wheeled worktables are isolated from the others and induced along the conveyance passage only with the sensor inducement system, being free from any mechanical restraint, there is no need for such labor and time for dismounting from and remounting on the chain as in the case of the assembly line driven with the endless chain.

With use of the wheeled worktable that has the configuration wherein the rectangle whose center line is parallel to the travelling direction of the wheeled worktable is defined on the bottom surface of the wheeled worktable while the isosceles triangle whose base and height are equal is defined in such manner that the symmetry axis thereof overlaps the center line of the rectangle with the base including the midpoint of the rectangle and wherein the driving wheel that has the steering function is disposed at the vertex of the isosceles triangle while the trailing wheels are securely disposed at both ends of the base in such manner that the revolving surfaces thereof are always in the direction parallel to the travelling direction of the wheeled worktable, the turning loci at the turning parts can be minimized and thus the assembly-line occupation area may be reduced.

What is claimed is:

1. A wire harness assembly line, comprising:

a predetermined conveyance passage defined by one or more objects; and a plurality of wheeled worktables, wherein a bottom surface of each wheeled worktable defines a rectangle whose center line is parallel to a traveling direction of the wheeled worktable, while an isosceles triangle whose base and height are equal is defined such that a symmetry axis of the triangle overlaps a center line of said rectangle with the base of the triangle including a longitudinal midpoint of said rectangle, each wheeled worktable comprising:

a sensor that detects the predetermined conveyance passage by sensing the one or more objects that define the predetermined conveyance passage;

a driving wheel that steers the wheeled worktable along the predetermined conveyance passage detected by the sensor, the driving wheel being disposed at a vertex of said isosceles triangle; and trailing wheels that are respectively disposed at other vertices of the isosceles triangle, revolving surfaces of the trailing wheels being always in a direction parallel to the traveling direction of the wheeled worktable.

2. A wheeled worktable for use in an assembly line, comprising:

a base;

a plurality of wheels rotatably attached to the base, the plurality of wheels including a driving wheel and a plurality of trailing wheels, the trailing wheels being provided on a line that passes through a longitudinal midpoint of the wheeled worktable, as seen in plan view;

a motor that drives the driving wheel; and a sensor that senses one or more objects that define a predetermined conveyance passage;

wherein one of the plurality of wheels steers the wheeled worktable along the predetermined conveyance passage defined by the one or more objects sensed by the sensor.

3. The wheeled worktable according to claim 2, wherein the driving wheel and two of the trailing wheels are located at positions together defining a triangle whose base and height are equal.

4. The wheeled worktable according to claim 3, wherein the triangle is an isosceles triangle.

5. The wheeled worktable according to claim 3, wherein a ratio of the height of the triangle, as measured in a longitudinal direction of the wheeled worktable, to a length of the worktable is about 3:14.

6. The wheeled worktable according to claim 2, wherein the trailing wheels always rotate in planes parallel to a traveling direction of the wheeled worktable.

7. The wheeled worktable according to claim 2, wherein said sensor is an optical sensor that optically recognizes the one or more objects.

8. The wheeled worktable according to claim 2, wherein the plurality of wheels further comprises auxiliary wheels that stably support the wheeled worktable, each auxiliary wheel rotating about an axis parallel to the base and being mounted on a wheel base that is freely rotatable about an axis orthogonal to the base.

9. The wheeled worktable according to claim 2, wherein the sensor is a magnetic sensor and the one or more objects are magnetically recognizable objects.

10. The wheeled worktable according to claim 2, further comprising an operation chart board for assembling a wire harness.

11. A wire harness assembly line, comprising:

a plurality of wheeled worktables according to claim 2; and the predetermined conveyance passage, defined by one or more objects recognizable by the sensor of each wheeled worktable.

12. A wheeled worktable for use in an assembly line, comprising:

a base;

a plurality of wheels rotatably attached to the base, the plurality of wheels including a driving wheel and two trailing wheels, the driving wheel and trailing wheels located at positions defining a triangle, wherein a ratio of the height of the triangle, as measured in a longitudinal direction of the wheeled worktable, to a length of the worktable is about 3:14;

a motor that drives the driving wheel; and a sensor that senses one or more objects that define a predetermined conveyance passage;

wherein one of the plurality of wheels steers the wheeled worktable along the predetermined conveyance passage defined by the one or more objects sensed by the sensor.

13. The wheeled worktable according to claim 12, wherein the triangle is an isosceles triangle.

14. The wheeled worktable according to claim 12, wherein the trailing wheels are provided on a line that passes through a longitudinal midpoint of the wheeled worktable, as seen in plan view.

15. The wheeled worktable according to claim 12, wherein the trailing wheels always rotate in planes parallel to a traveling direction of the wheeled worktable.

16. The wheeled worktable according to claim 12, wherein said sensor is an optical sensor that optically recognizes the one or more objects.

17. The wheeled worktable according to claim 12, wherein the plurality of wheels further comprises auxiliary wheels that stably support the wheeled worktable, each auxiliary wheel rotating about an axis parallel to the base and being mounted on a wheel base that is freely rotatable about an axis orthogonal to the base.

18. The wheeled worktable according to claim 12, wherein the sensor is a magnetic sensor and the one or more objects are magnetically recognizable objects.

19. The wheeled worktable according to claim 12, further comprising an operation chart board for assembling a wire harness.

20. A wire harness assembly line, comprising:

a plurality of wheeled worktables according to claim 12; and the predetermined conveyance passage, defined by one or more objects recognizable by the sensor of each wheeled worktable.

* * * * *